US010165768B2

(12) United States Patent
Montoya

(10) Patent No.: US 10,165,768 B2
(45) Date of Patent: Jan. 1, 2019

(54) SYSTEM AND APPARATUS FOR THE STORAGE AND DISPLAY OF FISHING LURES

(71) Applicant: Darryl Montoya, Aurora, CO (US)

(72) Inventor: Darryl Montoya, Aurora, CO (US)

(73) Assignee: Darryl Montoya, Aurora, CO (US)

( * ) Notice: Subject to any disclaimer, the term of this patent is extended or adjusted under 35 U.S.C. 154(b) by 0 days.

(21) Appl. No.: 15/728,042

(22) Filed: Oct. 9, 2017

(65) Prior Publication Data
US 2018/0084771 A1 Mar. 29, 2018

Related U.S. Application Data

(63) Continuation of application No. 14/818,097, filed on Aug. 4, 2015, now Pat. No. 9,807,993.

(51) Int. Cl.
*A01K 97/06* (2006.01)
*A47F 5/08* (2006.01)

(52) U.S. Cl.
CPC ............ *A01K 97/06* (2013.01); *A47F 5/0823* (2013.01)

(58) Field of Classification Search
CPC ........ A47F 5/0823; A47F 5/08; A47F 5/0815; A01K 97/06; Y10S 224/92
USPC ............ 224/920; 206/315.11; 43/54.1, 57.1, 43/57.2, 57.3, 55; 248/220.31
See application file for complete search history.

(56) References Cited

U.S. PATENT DOCUMENTS

| 2,954,874 | A | * | 10/1960 | Rouse | A47G 29/10 211/85.9 |
| 2,965,235 | A | * | 12/1960 | Daline | A47F 5/0823 211/1 |
| 3,905,570 | A | * | 9/1975 | Nieuwveld | F16L 3/127 24/339 |
| 4,040,202 | A | * | 8/1977 | Wille | A01K 97/06 43/57.2 |
| 4,238,901 | A | * | 12/1980 | Martinet | A01K 97/06 43/57.1 |
| 4,485,929 | A | | 12/1984 | Betts, Sr. | |
| 4,631,856 | A | * | 12/1986 | Born | A01K 97/06 206/315.11 |
| 4,914,853 | A | * | 4/1990 | Swindle | A01K 97/18 43/53.5 |
| 5,083,668 | A | | 1/1992 | Bushey | |

(Continued)

OTHER PUBLICATIONS

Apr. 14 2017 Final Office Action issued in U.S. Appl. No. 14/818,097.
(Continued)

*Primary Examiner* — Hiwot E Tefera
(74) *Attorney, Agent, or Firm* — Rocky Mountain Patent, LLC

(57) ABSTRACT

The present invention relates to the storage and display of objects, mainly fishing lures. The invention disclosed herein relates to the organization, management and display of objects to assist in the storage and use of lures, and other objects, through the disposition of an aperture associated with such an object over an apparatus. In the application of storage and display of fishing lures, the present disclosure allows for identification and selection of lures while maintaining the lures separately and in a hanging orientation maintaining the form or the lure consistent with how such a lure is pulled through the water when used.

14 Claims, 6 Drawing Sheets

(56) References Cited

U.S. PATENT DOCUMENTS

| | | | | |
|---|---|---|---|---|
| 5,367,814 A * | 11/1994 | Petersen | ............... | A01K 97/00 43/4 |
| 5,499,724 A | 3/1996 | Hickman | | |
| 5,573,405 A * | 11/1996 | Evans | ................... | G09B 19/00 116/325 |
| 5,664,707 A * | 9/1997 | Spector | ................... | A45D 2/00 223/48 |
| 5,813,550 A | 9/1998 | Sheehan | | |
| 5,829,185 A * | 11/1998 | Myers | .................. | A01K 97/06 206/315.11 |
| 6,023,876 A * | 2/2000 | Haddad | ................ | A01K 97/06 43/25.2 |
| 6,026,607 A * | 2/2000 | Bukowski | ............. | A01K 91/04 289/17 |
| 6,085,916 A * | 7/2000 | Kovacevic | ............... | A47F 7/24 211/86.01 |
| 6,264,046 B1 * | 7/2001 | Ford | ..................... | A47F 5/0006 206/459.5 |
| 6,301,826 B1 * | 10/2001 | Thorpe | ................. | A01K 97/06 43/57.1 |
| 6,443,316 B1 * | 9/2002 | Mao | ..................... | A47F 5/0807 211/41.3 |
| 6,460,946 B1 * | 10/2002 | Beukema | .............. | A47B 43/00 108/152 |
| 7,510,163 B2 * | 3/2009 | Schlitzkus | ............ | B60T 8/3685 248/548 |
| 8,966,811 B2 * | 3/2015 | Tremper | ................ | A01K 97/06 206/315.11 |
| 9,750,236 B1 * | 9/2017 | Diaz | ...................... | A01K 97/06 |
| 2007/0012832 A1 * | 1/2007 | Ottens | ................... | A47F 5/0823 248/220.41 |
| 2007/0051032 A1 * | 3/2007 | Moffitt | ................... | A01K 97/06 43/54.1 |
| 2007/0095997 A1 | 5/2007 | Case | | |
| 2008/0223801 A1 * | 9/2008 | Krempa | ................ | A47B 75/00 211/71.01 |
| 2009/0094881 A1 * | 4/2009 | Konopa | ................ | A01K 97/06 43/57.1 |
| 2010/0051769 A1 * | 3/2010 | Tyson | .................. | A47F 5/0807 248/220.31 |
| 2010/0282627 A1 * | 11/2010 | Paschke | .................. | A45C 5/03 206/315.11 |
| 2014/0033602 A1 * | 2/2014 | Gesik | .................. | A01K 97/06 43/57.1 |
| 2014/0096434 A1 * | 4/2014 | Tremper | ................ | A01K 97/06 43/54.1 |

OTHER PUBLICATIONS

Sep. 15, 2016 Office Action issued in U.S. Appl. No. 14/818,097.
Amazon.com, ASMC Industrial, Hammer Drive Anchor Mushroom Head with 304 Stainless Steel Nail Zink Alloy.

* cited by examiner

SYSTEM AND APPARATUS FOR THE STORAGE AND DISPLAY OF FISHING LURES

CROSS REFERENCE TO REFERENCE TO RELATED APPLICATIONS

This application claims the benefit of U.S. nonprovisional patent application Ser. No. 14/818,097 entitled "System and Apparatus for the Storage and Display of Fishing Lures" filed on Aug. 4, 2015, the entire contents of which are incorporated herein by reference in its entirety for all purposes.

FIELD OF INVENTION

The present invention relates to the storage and display of objects, mainly fishing lures. The invention disclosed herein relates to the organization, management and display of objects to assist in the storage and use of lures, and other objects, through the disposition of an aperture associated with such an object over an apparatus. In the application of storage and display of fishing lures, the present disclosure allows for identification and selection of lures while maintaining the lures separately and in a hanging orientation maintaining the form or the lure consistent with how such a lure is pulled through the water when used.

BACKGROUND OF THE INVENTION

As the act of fishing progressed, so has the equipment commonly referred to as tackle including rods, reels and lures. The tackle of today's fisherman often needs a concerted organizational strategy, particularly for the lures that can number in the hundreds or more considering the avid fisherman. These lures range in design and size appropriate for catching fish ranging in size from those held with a single hand to those weighing more than the fisherman themselves. Regardless of design and size, the number of lures that an individual fisherman may use creates issues with the storage and management of these lures.

The proper management of lures is important, as lures have grown increasingly complex and expensive. The mismanagement of lures can result in costly losses due to damaged equipment, time lost to the searching and untangling of lures as well as posing risk of injury to the user due to sharp and barbed ends.

Some prior art technologies compartmentalize lures in segmented volumes within larger containers to store and organize lures. The problem stemming from this strategy of lure management surrounds the placement and use of such compartments. Compartments are often not large or enough and the user is forced to stuff a large lure into a smaller compartment. Furthermore, the availability of compartments is limited to the size of the container forcing users to place multiple lures into one compartment that can cause tangling or damage to lures. Moreover, compartmentalized storage does not enable display or visible selection of lures, often requiring a user to open each of several a drawers or compartments to view the selection of lures available.

Some prior art technologies use apertures or rods to hang lures by their hook ends. Such solutions are problematic as the hook ends placed over bars or through apertures can be dulled or damaged when contacting other surfaces. The sharp point of a hook and barb, if damaged, require attention for sharpening or reshaping for optimal fishing operation. Furthermore, the storage of hooks using such of a hanging by the hook strategy is prone to inadvertent loss of retention if used in an environment such as on a boat experiencing motion due to the navigation of a body of water. Furthermore, examples of such prior art store lures upside-down, conflicting with their intended configuration when in use and drawn through the water. Prolonged of a lure in an upside-down configuration can affect the form of a lure and how it travels through water when pulled. The form of lures is particularly a concern in the case of lures that comprise pliable materials subject to tangling or plastic deformation when hung by the hook end.

Other prior art technologies use a soft material, such as silicone foam, permitting the embedding of a hook point into the foam allowing the hook to hang. This type of prior art solution shares the same problems as others in that it risks the damage or blunting of the point of the hook and hangs the lure upside down. Furthermore, the barb of some hooks when embedded into the soft material rips apart the soft material upon removal of the hook. Through repeated use, the retention ability of the soft material degrades and as such the chance of inadvertent loss of retention of the hook increases.

SUMMARY OF THE INVENTION

The present invention relates to a system and apparatus for the storage and display of objects. The invention disclosed herein relates to the features involved with the organization, management and display of objects to assist in the storage and use of lures when engaged in fishing.

Embodiments of the invention comprise at least one filament feature that transects a peg element intended for disposition within a matching aperture within a mounting surface, and further comprising a diameter-increasing element along a section of the filament unsupported by the peg element.

Certain embodiments comprising filament, peg, aperture within a mounting surface and diameter-increasing elements allow the disposition of a fishing lure eye over the diameter-increasing element for retention of the lure on the filament for secure storage and display.

DETAILED DESCRIPTION OF CERTAIN EMBODIMENTS

The present disclosure provides a solution to allow the storage, organization and display of fishing lures in a manner that mitigates damage, provides increased retention and while allowing the easy identification of such available lures. Embodiments of the present disclosure describe an apparatus and system allowing the hanging display of lures in a manner that retains the functional form. It will be appreciated to those skilled in the art that the present disclosure of the invention although directed toward the storage, organization and display of fishing lures, that the technology disclosed herein is not limited to use with fishing lures.

Figures 1A, 1B:
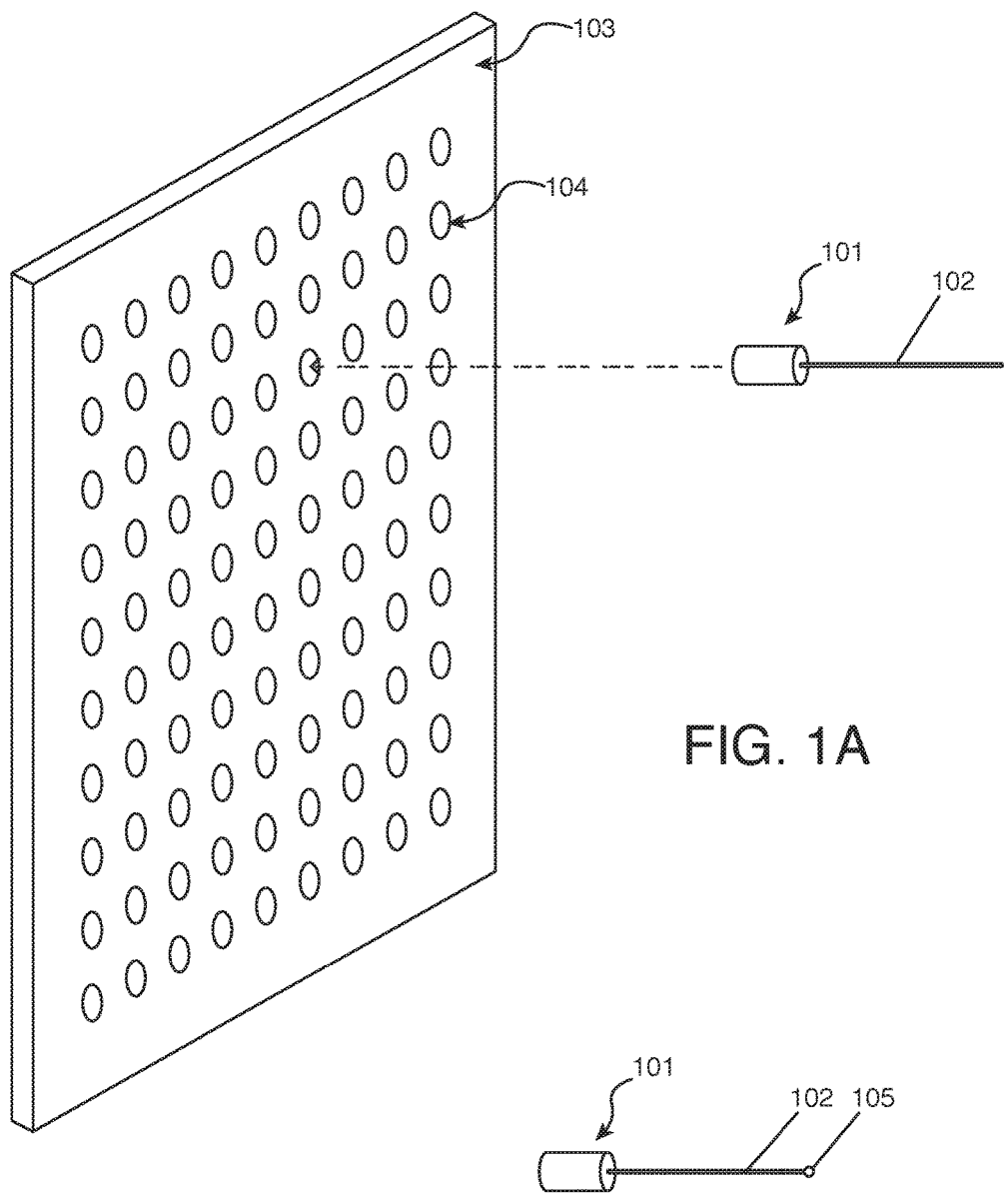
FIG. 1A—depicts an embodiment of an apparatus and system support, comprising a mounting surface for insertion of the apparatus.
FIG. 1B—depicts an embodiment of an apparatus comprising a peg element, filament and diameter-increasing element.

An apparatus, as shown in FIG. 1A, comprises peg 101 and filament 102 in conjunction with a mounting surface 103 exhibiting at least one aperture 104. Such a mounting surface 103 may be affixed to an existing structure as desired by a user. The filament 102, typically comprising a wire, partially supported by the peg element 101 at the proximal end, extends away from the peg element 101. Embodiments of the unsupported portion of the filament 102 include, but are not limited to a straight form, a form exhibiting a single angle and/or radius or a form exhibiting a plurality of forms comprising angles and/or radii.

It will be appreciated that the composition of the peg element 101 typically comprises polymeric compounds, but is not limited to such and may comprise compounds including but not limited to materials synthetic, organic, inorganic, metallic or other materials appreciated by those skilled in the art.

It will also be appreciated that the mounting surface 103 typically exemplifies but is not limited to, a board or panel form with thickness equal to or greater than the axial length of the peg 101.

In certain embodiments, as shown in FIG. 1B, the wire protruding from a peg has a diameter-increasing element 105, located distally away from the supporting peg 101. It will be appreciated by one skilled in the art that a "diameter-increasing" element as used herein increases the diameter of a filament over the span of a predetermined length.

Figure 2A:
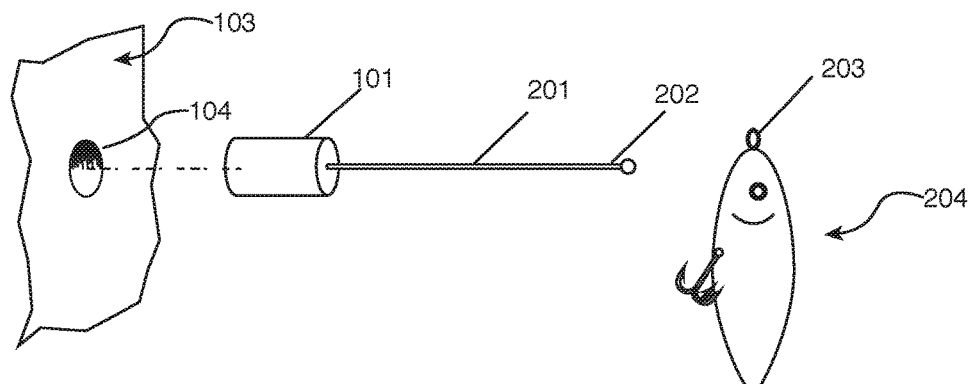
FIG. 2A—depicts an embodiment of an apparatus, comprising a spherical diameter-increasing element, prior to insertion into an aperture and lure for disposition over thereof.
Figure 2B:
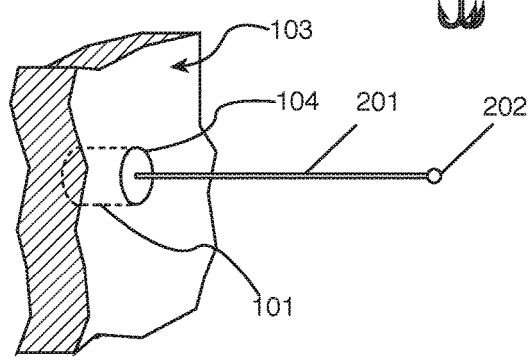
FIG. 2B—depicts an embodiment of an apparatus inserted into an aperture.
Figure 2C:
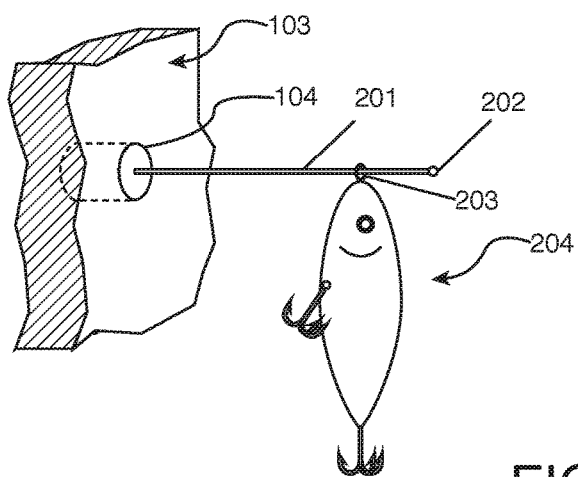
FIG. 2C—depicts the disposition of an eye of a lure over a diameter-increasing element of an embodiment apparatus for retention, display and/or storage.

In certain embodiments of an apparatus, as shown in FIGS. 2A and 2B, a peg 101 inserts into an aperture 104 on a mounting surface 103. A wire 201, partially supported by the peg 101 wherein the proximal end of the wire 201 axially transects the peg 101, does not traverse through the proximal end of the peg 101. An aperture 104 and peg 101 share similar profiles, allowing the insertion of the peg 101 into the aperture 104, constraining the peg 101 to the mounting surface 103. The wire element 201 protrudes away from the distal surface of the mounting surface 103. The wire 201 has a spherical diameter-increasing element 202 at the distal end. The peg 101 is inserted into an aperture 104 of the mounting surface 103 allowing a user to pass an eye 203 of a lure 204 over the spherical diameter-increasing element 202 thereby constraining the lure 204 to the wire 201, allowing a lure 204 to hang from the apparatus in a manner consistent with the intended configuration when in use and drawn through the water.

It will be appreciated by those skilled in the art that the effective dimension of a diameter-increasing element 202 is the maximum dimension of such an element, typically orthogonal to the wire 201. When the eye 203 of a lure 204 is disposed over the distal end of the wire 201 and beyond the effective dimension of the diameter-increasing element 202, the risk of inadvertent loss of lure 204 retention decreases with the decreasing tolerance between the inner-diameter a lure eye 203 and the effective dimension of a spherical diameter-increasing element 202.

Figure 3A:
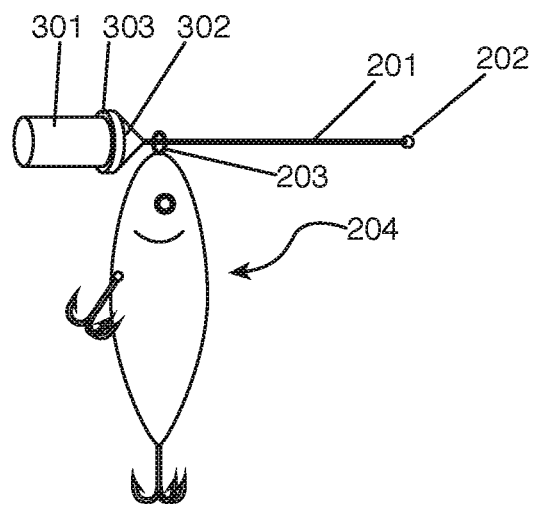
FIG. 3A—depicts an exemplary embodiment of an apparatus comprising a convex-conical element.

In yet another embodiment, as shown in FIG. 3A, a peg 301 exhibits a convex conical element 302 on the distal end. The convex conical element 302 extends past the inserted diameter of the peg 301, creating a shoulder 303 that prevents over-insertion of the peg 301 into an aperture 104 and also allows the spacing of a lure 204 away from a mounting surface 103, making it easier for a user to grasp the lure 204 when removing it.

Figure 3B:
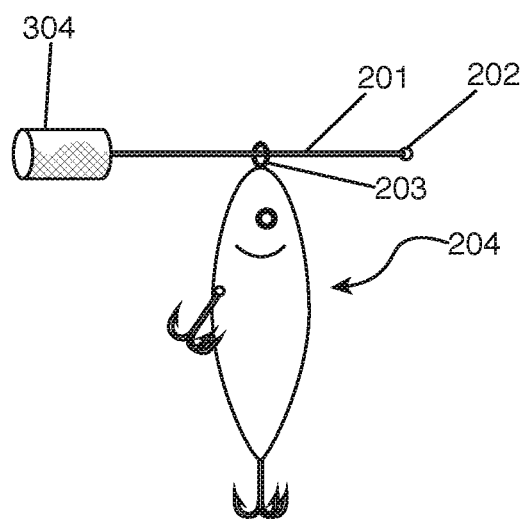
FIG. 3B—depicts an embodiment of an apparatus comprising a peg element with a texturized surface.

In certain embodiments, as shown in FIG. 3B, a peg 304 has a textured surface to provide increased friction within an aperture 104 to prevent unintended disconnection of the peg 304 from the mounting surface 103. Such texturizing may take the form of, but is not limited to, knurling, axial grooves or an applied coating.

Figure 4A:
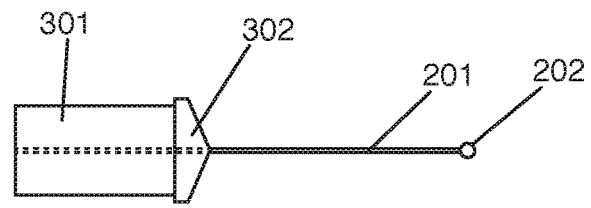
FIG. 4A—depicts an exemplary embodiment of an apparatus comprising a straight filament and diameter-increasing element.

In yet another embodiment, shown in FIG. 4A comprises a wire 201 axially transecting a peg 301 with a convex conical element 302, the exposed section of the wire 201 extends axially from the peg 301 in a straight form. This embodiment further comprises a spherical diameter-increasing element 202 at the distal end of the wire 201.

Figure 4B:
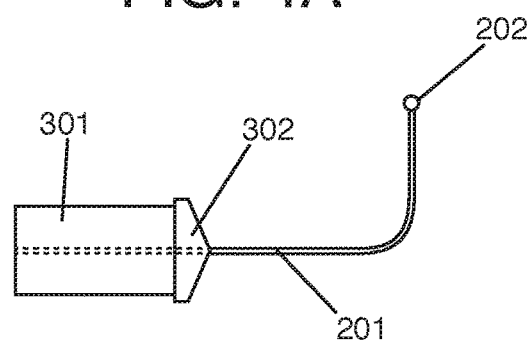
FIG. 4B—depicts an exemplary embodiment of an apparatus comprising a 90-degree bend and diameter-increasing element.

Certain embodiments, shown in FIG. 4B comprises a wire element 201 axially transecting a peg 301 with a convex conical element 302, the exposed section of the wire 201 extends axially from the peg 301 in a straight path and further exhibits a 90-degree radius bend, distally located from the peg 301. This embodiment further comprises a spherical diameter-increasing element 202 at the distal end of the wire 201.

Figure 4C:
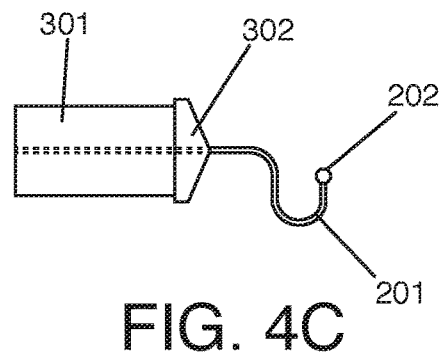
FIG. 4C—depicts an exemplary embodiment of an apparatus comprising a straight filament with a hook-like element and diameter-increasing element.

In another embodiment, shown in FIG. 4C, comprises a wire 201 axially transecting a peg 301 with a convex conical element 302, the unsupported section of the wire 201 extends axially from the peg 301 in a straight path, and has a hook-like shape at the distal end of the wire. In certain embodiments, the wire 201 has a 90-degree radius bend distally located from the peg 301 followed by a 180-degree radius bend distally located from the 90-degree radius bend within the same plane as the 90-degree bend. This embodiment further comprises a spherical diameter-increasing element 202 at the distal end of the wire 201.

Figure 4D:
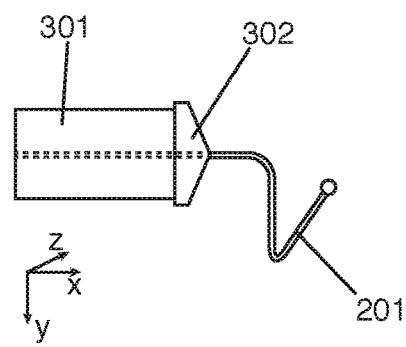
FIG. 4D—depicts an exemplary embodiment of an apparatus comprising two 90-degree bends and diameter-increasing element.

In yet another embodiment, shown in FIG. 4D, a wire 201 extends from a peg 301. The wire has a bend in a direction parallel to the longitudinal plane of the mounting surface 103, and has another bend in a direction parallel to the latitudinal plane of the mounting surface 103. For example, the wire 201 axially transects a peg 301 with a convex conical element 302, the exposed section of the wire 201 extends axially from the peg 301 in an x-direction, prior to making a 90-degree radius bend in a y-direction followed by a second 90-degree radius bend in a z-direction. It will be appreciated that the reference of x- y- and z-directions are in accordance with the commonly accepted three-dimensional Cartesian plane conventions. This embodiment further comprises a spherical diameter-increasing element 202 at the distal end of the wire 201.

Figure 5A:
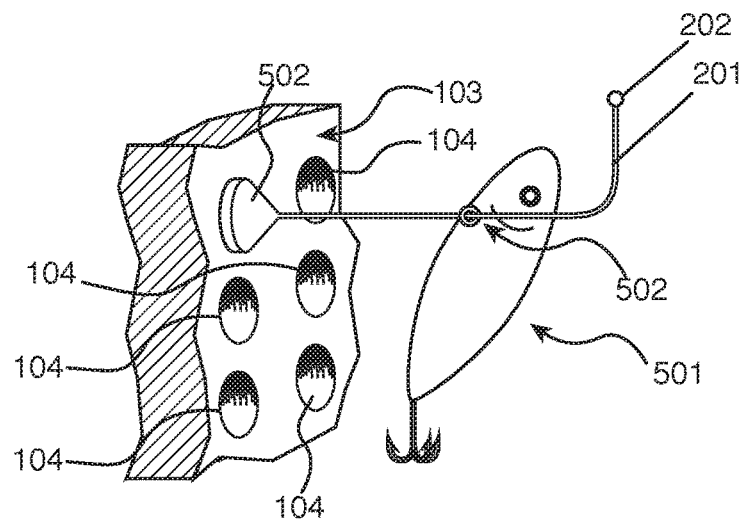
FIG. 5A—depicts an exemplary embodiment of an apparatus as used in coordination with a system for the display and storage or fishing lures.
Figure 5B:
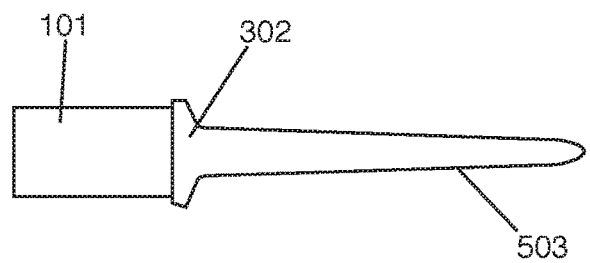
FIG. 5B—depicts an embodiment of an apparatus that can guide and adjust the hanging orientation of a fishing lure as hanging from an apparatus as well as providing another hanging element.
Figure 5C:
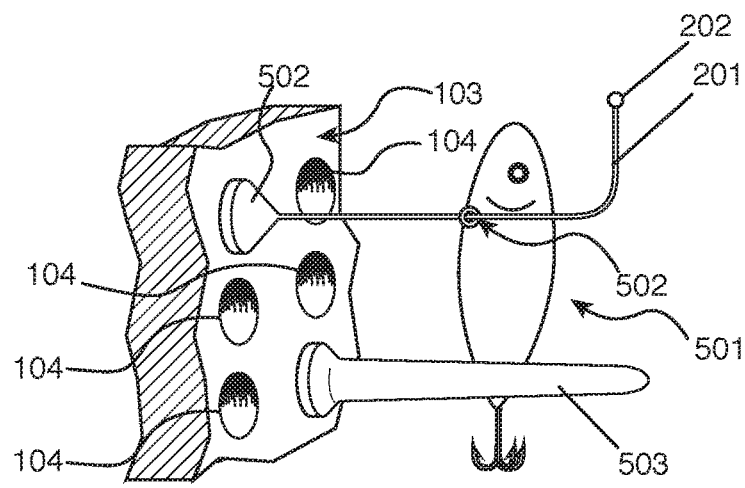
FIG. 5C—depicts exemplary embodiments of an apparatus used in coordination with a system for the display and storage or fishing lures in a desired orientation.

In certain embodiments, as demonstrated in FIG. 5A, a lure 501 may not hang vertically when disposed onto a wire 201 constrained to a mounting surface 103 due to an offset eye 502 position related to its function or due to the motion of a vehicle on which it is being used, such as a boat. This increases the chances of multiple lures 501 hitting each other, causing damage or undesirable results, such as tangling. In such situations, embodiments comprise a peg 101, and a wire 201 encased in a polymeric coating 503, which allows a user to use an aperture 104 inferior or laterally inferior to the eye of the lure 501 to provide a boundary or to straighten its hanging orientation. In certain embodiments, seen in FIGS. 5B and 5C, the peg and the wire encased in a polymeric coating can be used as another element on which items such as larger lures or unopened lures may be hanged.

In certain embodiments, a lure hanging system comprises a mounting surface 103 having a panel thickness mounted to an existing structure. The mounting surface 103 is of at least 12.7 mm (0.5 in) thickness exhibiting a plurality of apertures 104, of at least 3.175 mm (0.125 in) diameter, but preferably 6.35 mm (0.25 in) diameter. The apertures 104 have a depth of at least 6.35 mm (0.25 in), but preferably 12.7 mm (0.5 in). The spacing of said apertures 104 may be of a variety of patterns, matrix or custom drilled by the user to meet specific mounting needs. The lure hanging system comprises a peg 301 having a convex conical element 302, a wire 201 and a spherical diameter-increasing element 202. The wire 201, of metallic composition and typically of stainless steel, typically exhibits the spherical diameter-increasing element 202 at the distal end. The proximal end of the wire 201 is embedded axially within and supported by the peg 301. The spherical diameter-increasing element 202 of this particular embodiment typically comprises a plastic or stainless steel composition. The wire 201 and spherical diameter-increasing elements 202 are sized to permit the disposition of the eye 203 of a lure 204 over the spherical diameter-increasing element 202 and onto the wire 201 with minimal tolerance between the inner diameter of the lure eye 203 and the maximum dimension of the spherical diameter-increasing element 202. The alternative sizes of the wire 201 and spherical diameter-increasing elements 202 associated with this embodiment include, but are not limited to the sizes provided in Table 1.

TABLE 1

| Pin Size | Lure Weight | Overall Length | Wire Gauge | Ball-End Element Size |
| --- | --- | --- | --- | --- |
| Small | 0.886-10.6 g (1/32-3/8 oz) | 3.8 cm (1.5 in) | 28 ga | 0.75 mm (0.0295 in) |

TABLE 1-continued

| Pin Size | Lure Weight | Overall Length | Wire Gauge | Ball-End Element Size |
| --- | --- | --- | --- | --- |
| Medium | 10.6-56.7 g (3/8-2 oz) | 5.1 cm (2.0 in) | 20 ga | 1.5 mm (0.0591 in) |
| Large | 56.7-141.7 g (2-5 oz) | 7.6 cm (3.0 in) | 12 ga | 3 mm (0.138 in) |
| Extra Large | 141.7-340.2 g (5-12 oz) | 10.2 cm (4.0 in) | 4 ga | 6.5 mm (0.236 in) |

The peg 301 has a cylindrical form, comprises a polymeric composition having a textured surface on the curved surface of the peg 301. The peg exhibits a diameter to provide the desired fit into the apertures 104 in the mounting surface 103. The fit includes but is not limited to a friction or press fit.

Figure 6A:
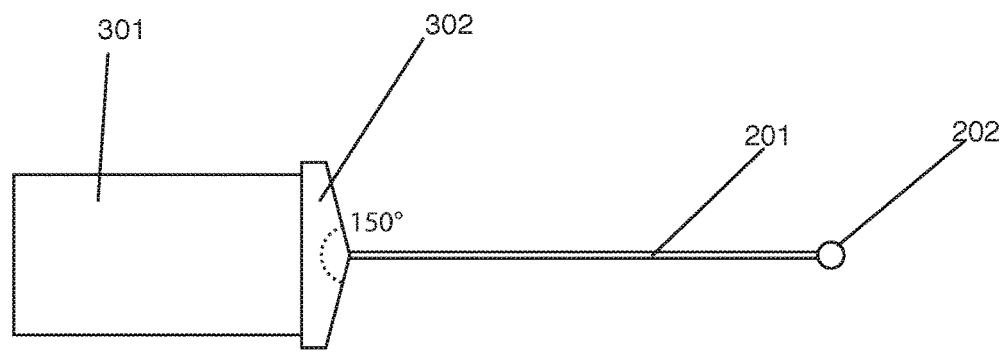
FIG. 6A—depicts an exemplary embodiment of an apparatus and the angle of a convex-conical element.
Figure 6B:
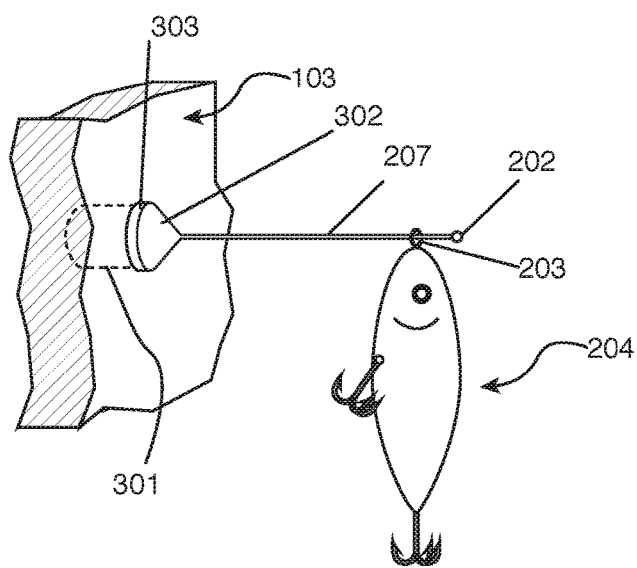
FIG. 6B—depicts an exemplary embodiment of an embodiment wherein a convex-conical element prevents the over-insertion of a peg element into an aperture.

As shown in FIG. 6A, an embodiment of an apparatus comprising a convex conical element 302 at the distal end of the peg 301 having an obtuse angle of typically 150-degrees. Furthermore, as shown in FIG. 6B, the base diameter of the convex conical element 302 exceeds the cylindrical diameter of the peg 301, creating a shoulder element 303, preventing the over-insertion of the peg 301 into the mounting surface 103. When the apparatus is inserted into an aperture 104 of the mounting surface 103, this enables a user to mount a lure 204 to the system by placing the eye 203 of the lure 204 over the spherical diameter-increasing element 202 and onto the wire element 201 thereby constraining the lure 204 to the wire element 201 of the apparatus.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The descriptive labels associated with the numerical references in the figures are intended to merely illustrate embodiments of the invention, and are in no way intended to limit the invention to the scope of the descriptive labels.

What is claimed is:

1. An apparatus for the storage of fishing lures through an eyelet of a lure comprising:
   a peg, having a constant cross-sectional profile elongated along a longitudinal axis of the peg from a proximal end of the peg to a distal end of the peg;
   a proximal portion of the peg comprising a textured surface;
   a wire having a proximal end and a distal end, with the proximal end of the wire transecting the peg, and the distal end of the wire directed upwards;
   the wire having a proximal portion within the peg and a distal cantilevered portion extending from the peg;
   wherein the cantilevered portion retains the lure when the eyelet of the lure is disposed over the wire; and
   a mounting surface;
   the mounting surface comprising a plurality of apertures; and
   the apertures having a cross-sectional profile that matches a cross-section of the peg creating an interference fit, wherein the textured surface of the peg is retained within an aperture of the plurality of apertures, and
   wherein the cantilevered portion further comprises a diameter increasing element.

2. The apparatus of claim 1 wherein the diameter-increasing element comprises a spherical form.

3. The apparatus of claim 1 wherein the diameter-increasing element is affixed axially to the wire.

4. The apparatus of claim 1 wherein the diameter-increasing element comprises a metallic composition.

5. The apparatus of claim 1 wherein the diameter-increasing element comprises a polymeric composition.

6. The apparatus of claim 1 wherein the diameter-increasing element is attached to the distal end of the wire.

7. An apparatus for the storage of fishing lures through an eyelet of a lure comprising:
- a peg, having a constant cross-sectional profile elongated along a longitudinal axis of the peg from a proximal end of the peg to a distal end of the peg;
- the peg further comprising a conical element at said distal end of the peg,
- wherein the base diameter of the conical element is greater than the diameter of the peg and the conical element tapers linearly from the base diameter to a central portion of the conical element;
- a wire having a proximal end and a distal end, with the proximal end of the wire transecting the peg, and the distal end of the wire directed upwards;
- the wire having a proximal portion within the peg, and a distal cantilevered portion extending, from the peg;
- wherein the cantilevered portion retains the lure when the eyelet of the lure is disposed over the wire; and
- a mounting surface;
- the mounting surface comprising a plurality of apertures; and
- an aperture of the plurality of apertures having a cross-sectional profile that matches a cross-section of the peg creating an interference fit, wherein the peg is retained within the aperture.

8. The apparatus of claim 7, wherein a proximal portion of the peg comprises a textured surface which is configured to be retained within an aperture of the plurality of apertures.

9. The apparatus of claim 7 wherein the peg comprises a polymeric composition.

10. The apparatus of claim 7 wherein the cantilevered portion further comprises a diameter increasing element.

11. The apparatus of claim 10 wherein the diameter-increasing element comprises a spherical form.

12. The apparatus of claim 10 wherein the diameter-increasing element is attached to the distal end of the wire.

13. The apparatus of claim 7 wherein the conical element comprises an angle of approximately 150-degrees.

14. The apparatus of claim 7 wherein the wire is covered in a polymeric compound.

* * * * *